No. 736,620. PATENTED AUG. 18, 1903.
J. S. NAVARRO.
CAR STRAP FOR STREET CARS.
APPLICATION FILED MAR. 11, 1903.
NO MODEL.
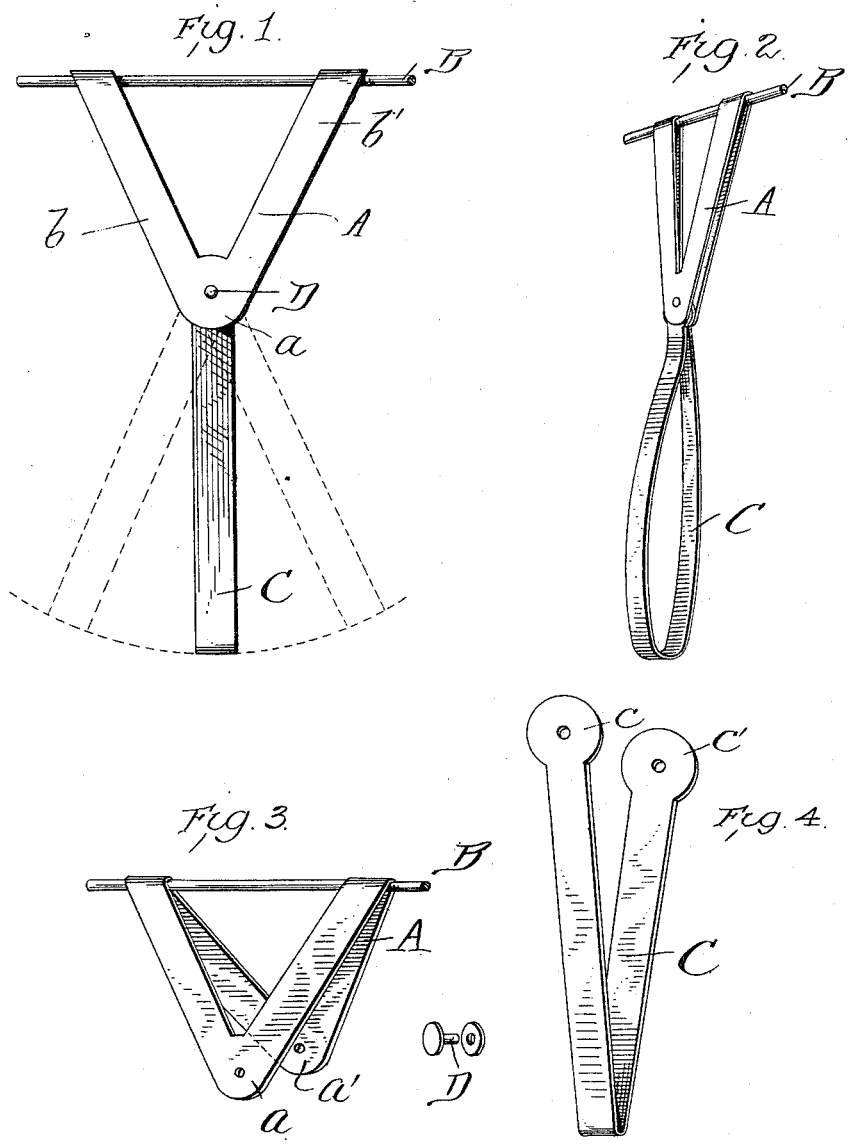

No. 736,620. Patented August 18, 1903.

UNITED STATES PATENT OFFICE.

JULIO SOTO NAVARRO, OF HAVANA, CUBA.

CAR-STRAP FOR STREET-CARS.

SPECIFICATION forming part of Letters Patent No. 736,620, dated August 18, 1903.

Application filed March 11, 1903. Serial No. 147,345. (No model.)

*To all whom it may concern:*

Be it known that I, JULIO SOTO NAVARRO, a citizen of the Republic of Cuba, and a resident of No. 88 Prado street, city of Havana, Cuba, have invented and produced a new and original Improvement in Leather Car-Straps for Street and Elevated Railroad Cars, of which the following is a specification, reference being had to the accompanying drawings, forming part of same.

The invention consists in the features and combination and arrangement of parts hereinafter described, and particularly pointed out in the claim.

In the drawings, Figure 1 is a side elevation of the device. Fig. 2 is a perspective view. Fig. 3 shows the different parts of the invention before assembling.

In the drawings, A is the main strap, formed from a piece of leather or the like cut in the shape of a diamond, with circular portions $a$ $a'$ at each end thereof. This diamond-shaped piece is then doubled on itself, forming a loop in the shape of an angle, the arms $b$ $b'$ of which are composed of two members, the members of each pair of arms ending in the circular portions $a$ $a'$. This strap is adapted to be supported by a bar B, such as is ordinarily used for this purpose, the members of each arm passing on each side of the bar.

The hand-strap C is formed of a narrow strip of material having circular portions $c$ $c'$, corresponding to the portions $a$ $a'$ of the main strap. This strap is adapted to be folded on itself, so as to form a loop, with the portions $c$ $c'$ forming the end thereof. A suitable pivot, such as that shown at D, is also provided.

The parts are assembled in the following manner: The main strap A is placed on the bar, as before described, with the portions $a$ $a'$ in alinement, and then the portions $c$ $c'$ of the hand-strap are placed between the portions $a$ $a'$ and held therein by the pivot D, passing through the four portions. By this means the hand-strap is allowed to swing backward and forward on the pivot, as shown in dotted lines in Fig. 1.

I claim as my invention—

A hand-strap for cars comprising a main part formed in the shape of a diamond, a bar, said main part being doubled around the bar to be supported thereby, a hand-strap and a pivot connecting the main part to the hand-strap.

In witness whereof I have hereunto set my hand in presence of two witnesses.

JULIO SOTO NAVARRO.

Witnesses:
S. D. HARRISS,
RAMON AGUSTI.